United States Patent
Allgor et al.

(10) Patent No.: US 11,975,886 B2
(45) Date of Patent: May 7, 2024

(54) DEVICE FOR STORAGE AND DISPOSAL OF WASTE OIL AND GREASE

(71) Applicants: Ella Cecelia Allgor, Seattle, WA (US); Thomas Reed Bioren, Seattle, WA (US); Mira Rose Shupe, Seattle, WA (US)

(72) Inventors: Ella Cecelia Allgor, Seattle, WA (US); Thomas Reed Bioren, Seattle, WA (US); Mira Rose Shupe, Seattle, WA (US)

(*) Notice: Subject to any disclaimer, the term of this patent is extended or adjusted under 35 U.S.C. 154(b) by 0 days.

(21) Appl. No.: 18/167,999

(22) Filed: Feb. 13, 2023

(65) Prior Publication Data

US 2023/0192347 A1 Jun. 22, 2023

Related U.S. Application Data

(63) Continuation of application No. 16/296,597, filed on Mar. 8, 2019.

(60) Provisional application No. 62/648,931, filed on Mar. 27, 2018.

(51) Int. Cl.
| | | |
|---|---|---|
| *B65D 1/26* | (2006.01) | |
| *A47J 47/00* | (2006.01) | |
| *B01J 20/22* | (2006.01) | |
| *B65D 1/24* | (2006.01) | |

(52) U.S. Cl.
CPC .......... *B65D 1/26* (2013.01); *A47J 47/00* (2013.01); *B01J 20/22* (2013.01); *B65D 1/24* (2013.01)

(58) Field of Classification Search
CPC .... B65D 1/26; B65D 1/24; A47J 47/00; B01J 20/22

USPC .......................................................... 220/574
See application file for complete search history.

(56) References Cited

U.S. PATENT DOCUMENTS

| | | | |
|---|---|---|---|
| 3,487,439 A | 12/1969 | Winston | |
| 4,923,725 A | 5/1990 | Zafiroglu | |
| 6,107,242 A | 8/2000 | Ackerman et al. | |
| 6,365,214 B1 | 4/2002 | Kirk | |
| 6,394,313 B1 | 5/2002 | Wesley | |
| 6,408,568 B1 | 6/2002 | Kusey et al. | |
| 6,793,092 B1 | 9/2004 | Hayakawa et al. | |
| 8,016,150 B1 | 9/2011 | Bunch et al. | |
| 9,192,265 B1 | 11/2015 | Johnson | |
| 10,493,389 B2 * | 12/2019 | Siegert | C11B 3/008 |
| 2003/0121802 A1 | 7/2003 | Macquoid | |
| 2006/0204621 A1 | 9/2006 | Piepenbrink | |
| 2010/0124583 A1 | 5/2010 | Medoff | |
| 2012/0279930 A1 | 11/2012 | Iceton | |
| 2012/0311972 A1 | 12/2012 | Hunter | |

(Continued)

FOREIGN PATENT DOCUMENTS

| | | | | |
|---|---|---|---|---|
| FR | 2997068 A1 * | 4/2014 | | B65D 1/34 |
| FR | 2997068 A1 | 4/2014 | | |

*Primary Examiner* — J. Gregory Pickett
*Assistant Examiner* — Niki M Eloshway
(74) *Attorney, Agent, or Firm* — Fortem IP LLP; Mary L. Fox; Katrina Marcelo

(57) ABSTRACT

Devices and associated methods for containing and/or disposing of hydrocarbon fluids are disclosed herein. One aspect of the present technology, for example, includes a vessel formed of a plant-based absorbent substrate with an interior region configured to receive and retain a hydrocarbon fluid of at least 250 degrees Fahrenheit for at least 14 days without substantial deformation of the vessel or leaching of the hydrocarbon fluid.

17 Claims, 9 Drawing Sheets

(56) References Cited

U.S. PATENT DOCUMENTS

| | | |
|---|---|---|
| 2013/0037437 A1 | 2/2013 | Tsai |
| 2014/0102987 A1 | 4/2014 | Yusuf et al. |
| 2015/0147786 A1 | 5/2015 | Clarkson |
| 2016/0145480 A1* | 5/2016 | Krigstin .................. B05D 7/10 |
| | | 427/393 |
| 2017/0233140 A1 | 8/2017 | Mcmunn |
| 2018/0014668 A1* | 1/2018 | Lehmann ............... A47G 19/00 |
| 2019/0276636 A1 | 9/2019 | Posada Correa et al. |
| 2019/0300225 A1 | 10/2019 | Allgor et al. |
| 2020/0055657 A1 | 2/2020 | Jonsson |

* cited by examiner

DEVICE FOR STORAGE AND DISPOSAL OF WASTE OIL AND GREASE

CROSS-REFERENCE TO RELATED APPLICATION(S)

The present application is a continuation of U.S. patent application Ser. No. 16/296,597, filed Mar. 8, 2019, which claims the benefit of priority to U.S. Provisional Application No. 62/648,931, filed Mar. 27, 2018, each of which is incorporated by reference herein in its entirety.

TECHNICAL FIELD

The present technology relates to the disposal of waste fats, oils, and grease, and associated systems and methods of use. In particular, the present technology is directed to devices for the collection, storage, and disposal of waste cooking oils and preventing damage to sanitary drains, sewers, and pipes, and the manufacture thereof.

BACKGROUND

The consolidation and saponification of fats, oils, and grease with other inert objects such as baby wipes, cigarettes, and construction debris can occlude residential and municipal sanitary drains and sewers. The resulting occlusions, known as "fatbergs", restrict flow through the system and cause system backups, overflows, and system failures.

Fats, oils, and grease enter the system via disposal of waste cooking products in drains by individuals without an improved means of disposal. Once within the system, the fatty acids of the fats, oils and grease saponify and harden through a chemical salt reaction with the basic surface of sewer pipes. The resultant salt builds up on sewer walls and restricts the conduit of flow.

Fatbergs are wreaking havoc on city sewers throughout the world. London recently had a fatberg the size of a Boeing 737 weighing over 130 tons clogging its sewer system. New York City spends over $5 million annually fighting fatbergs. The problem is not limited to large cities. Small cities also deal with the problem.

Accordingly, there is a need for improved methods of disposal of fats, oils, and grease.

SUMMARY

The present technology is directed to an improved device for the collection and disposal of wastefats, oils, and grease. The improved device is manufactured with a plant-based substrate and is suitable for biological treatment and disposal.

The subject technology is illustrated, for example, according to various aspects described below, including with reference to FIGS. 1-9B. Various examples of aspects of the subject technology are described as numbered clauses (1, 2, 3, etc.) for convenience. These are provided as examples and do not limit the subject technology.

Clause 1. A device for containing hydrocarbons comprising:
  a vessel formed of a plant-based absorbent substrate with an interior region configured to receive and retain a hydrocarbon fluid of at least 250 degrees Fahrenheit for at least 1 day without substantial deformation of the vessel or leaching of the hydrocarbon fluid.

Clause 2. The device of Clause 1, wherein the substrate is sawdust.

Clause 3. The device of Clause 1 or Clause 2, wherein a volume of voids of the underlying substrate of the formed vessel is equal to or greater than a volume of the interior region of the vessel.

Clause 4. The device of any one of Clauses 1 to 3, wherein at least 90% of the substrate can be converted into carbon dioxide, water, and minerals by biological processes within a period of 6 months.

Clause 5. The device of any one of Clauses 1 to 4, wherein the vessel has a tapered profile in which a bottom portion of the vessel has a smaller diameter than a top portion of the vessel.

Clause 6. The device of any one of Clauses 1 to 5, wherein the substrate is substantially impermeable to the hydrocarbon fluid.

Clause 7. The device of any one of Clauses 1 to 6, wherein the substrate includes sugarcane bagasse.

Clause 8. The device of any one of Clauses 1 to 7, wherein the substrate includes coconut coir.

Clause 9. The device of any one of Clauses 1 to 8, wherein the substrate includes rice husk.

Clause 10. The device of any one of Clauses 1 to 9 wherein the hydrocarbon fluid is at least one of a fat, an oil, and/or a grease.

Clause 11. A device for containing hydrocarbons comprising:
  a vessel formed of a plant-based absorbent substrate with an interior region configured to receive and retain a hydrocarbon fluid of at least 250 degrees Fahrenheit for at least 2 days without substantial leaching of the hydrocarbon fluid,
  wherein the vessel includes an outer substrate and an interior substrate, the outer substrate having a lower hydraulic conductivity than the interior substrate, and wherein, at least when the vessel first receives the hydrocarbon fluid, the interior substrate is closer to the hydrocarbon fluid than the outer substrate.

Clause 12. The device of Clause 11, wherein the outer substrate and the interior substrate are the same material, and wherein the outer substrate has a different degree of compaction and a different degree of bulk density than the interior substrate.

Clause 13. The device of Clause 11 or Clause 12, wherein the outer substrate and the interior substrate are different materials, and wherein the outer substrate has a different degree of compaction and a different degree of bulk density than the interior substrate.

Clause 14. The device of any one of Clauses 11 to 13, wherein the substrate of the outer layer is wax.

Clause 15. The device of any one of Clauses 11 to 14, wherein the substrate of the outer layer is lignin.

Clause 16. The device of any one of Clause 11 to 15, wherein the substrate of the outer layer is a polymer.

Clause 17. A method of manufacture, comprising:
  forming a vessel by applying a pressure of at least 24,000 psi to a plant-based substrate, the vessel having an interior region configured to receive and retain a hydrocarbon fluid.

Clause 18. The method of Clause 17 within the vessel is formed without the aid of an external binding agent.

Clause 19. The method of Clause 17 or Clause 18, wherein the pressure is applied hydraulically.

Clause 20. The method of any one of Clause 17 to 19, wherein the vessel is a bowl.

Clause 21. The method of any one of Clause 17 to 20, wherein the vessel is a cup.

Clause 22. The method of any one of Clause 17 to 21, wherein the vessel includes a plurality of discrete compartments, each of which is configured to retain a discrete volume of the hydrocarbon fluid.

Clause 23. The method of any one of Clause 17 to 22, wherein an outer layer of the vessel is compacted to provide a substantially impermeable layer.

Clause 24. The method of any one of Clause 17 to 23, wherein the innermost layer of the vessel is compacted to provide a substantially permeable layer.

Clause 25. The device of any one of Clauses 1 to 10, wherein the interior region is configured to receive and retain the hydrocarbon fluid of at least 250 degrees Fahrenheit for at least 2 days without substantial deformation of the vessel or leaching of the hydrocarbon fluid.

Clause 26. The device of any one of Clauses 1 to 10, wherein the interior region is configured to receive and retain the hydrocarbon fluid of at least 250 degrees Fahrenheit for at least 3 days without substantial deformation of the vessel or leaching of the hydrocarbon fluid.

Clause 27. The device of any one of Clauses 1 to 10, wherein the interior region is configured to receive and retain the hydrocarbon fluid of at least 250 degrees Fahrenheit for at least 4 days without substantial deformation of the vessel or leaching of the hydrocarbon fluid.

Clause 28. The device of any one of Clauses 1 to 10, wherein the interior region is configured to receive and retain the hydrocarbon fluid of at least 250 degrees Fahrenheit for at least 5 days without substantial deformation of the vessel or leaching of the hydrocarbon fluid.

Clause 29. The device of any one of Clauses 1 to 10, wherein the interior region is configured to receive and retain the hydrocarbon fluid of at least 250 degrees Fahrenheit for at least 6 days without substantial deformation of the vessel or leaching of the hydrocarbon fluid.

Clause 30. The device of any one of Clauses 1 to 10, wherein the interior region is configured to receive and retain the hydrocarbon fluid of at least 250 degrees Fahrenheit for at least 7 days without substantial deformation of the vessel or leaching of the hydrocarbon fluid.

Clause 31. The device of any one of Clauses 1 to 10, wherein the interior region is configured to receive and retain the hydrocarbon fluid of at least 250 degrees Fahrenheit for at least 8 days without substantial deformation of the vessel or leaching of the hydrocarbon fluid.

Clause 32. The device of any one of Clauses 1 to 10, wherein the interior region is configured to receive and retain the hydrocarbon fluid of at least 250 degrees Fahrenheit for at least 9 days without substantial deformation of the vessel or leaching of the hydrocarbon fluid.

Clause 33. The device of any one of Clauses 1 to 10, wherein the interior region is configured to receive and retain the hydrocarbon fluid of at least 250 degrees Fahrenheit for at least 10 days without substantial deformation of the vessel or leaching of the hydrocarbon fluid.

Clause 34. The device of any one of Clauses 1 to 10, wherein the interior region is configured to receive and retain the hydrocarbon fluid of at least 250 degrees Fahrenheit for at least 11 days without substantial deformation of the vessel or leaching of the hydrocarbon fluid.

Clause 35. The device of any one of Clauses 1 to 10, wherein the interior region is configured to receive and retain the hydrocarbon fluid of at least 250 degrees Fahrenheit for at least 12 days without substantial deformation of the vessel or leaching of the hydrocarbon fluid.

Clause 36. The device of any one of Clauses 1 to 10, wherein the interior region is configured to receive and retain the hydrocarbon fluid of at least 250 degrees Fahrenheit for at least 13 days without substantial deformation of the vessel or leaching of the hydrocarbon fluid.

Clause 37. The device of any one of Clauses 1 to 10, wherein the interior region is configured to receive and retain the hydrocarbon fluid of at least 250 degrees Fahrenheit for at least 14 days without substantial deformation of the vessel or leaching of the hydrocarbon fluid.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

The detailed description set forth below is intended as a description of various configurations of the subject technology and is not intended to represent the only configurations in which the subject technology may be practiced. The detailed description includes specific details for the purpose of providing a thorough understanding of the subject technology. However, the subject technology may be practiced without these specific details. In some instances, well-known structures and components are not shown, or are shown schematically or in block diagram form, to avoid obscuring the concepts of the subject technology.

Figure 1A:
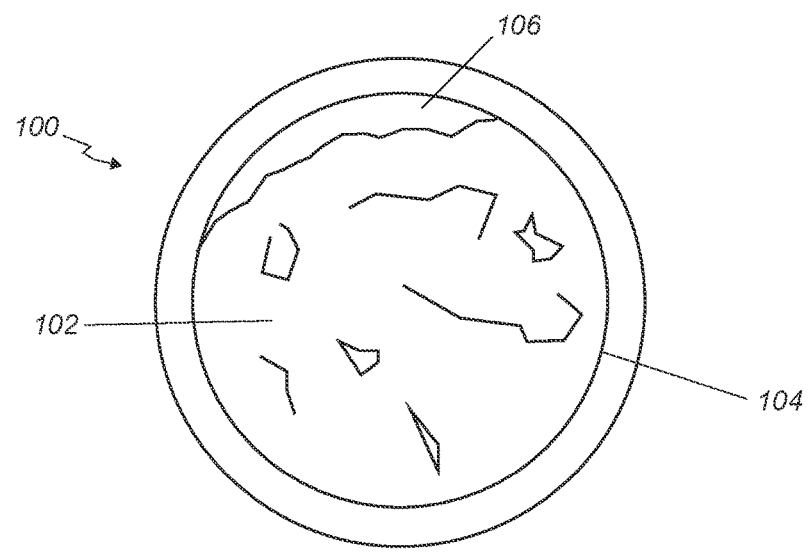
FIGS. 1A and 1B are a side view and an end view, respectively, of a drain or sewer occluded by fats, oils and grease.
Figure 1B:
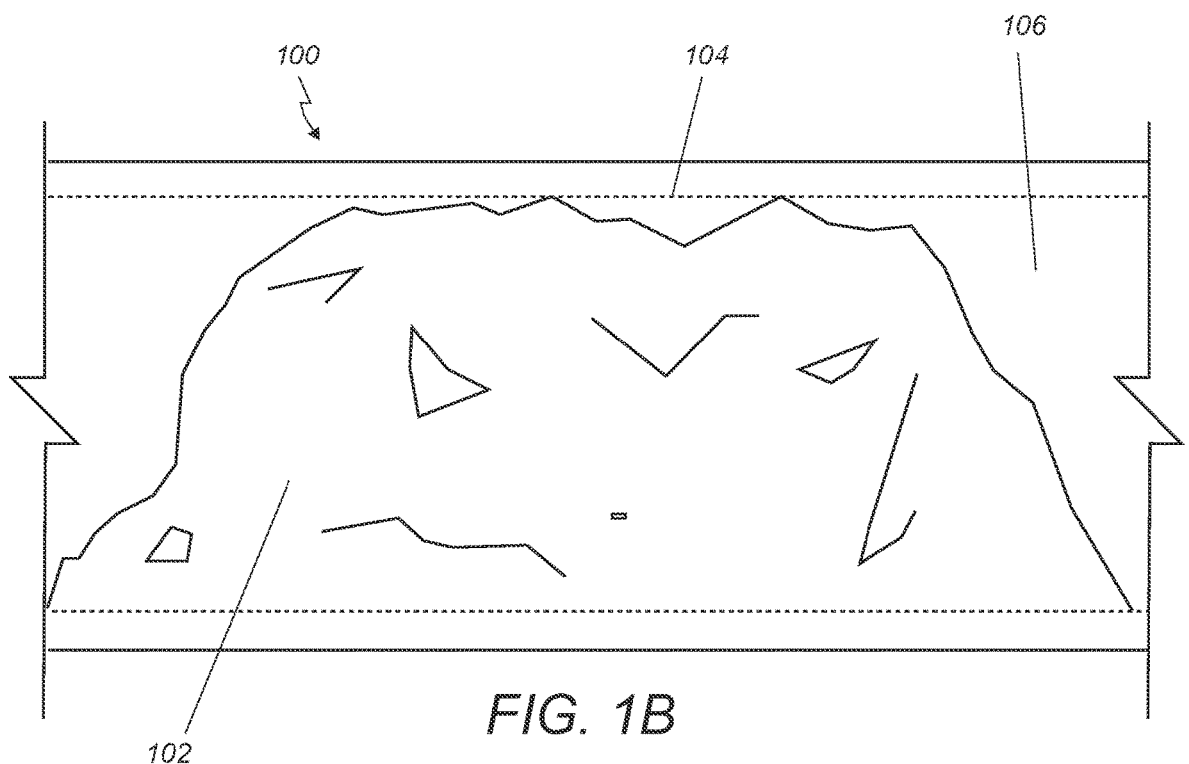

FIGS. 1A and 1B depict the occlusion of a conduit 100 by the collection of fats, oils or grease 102 on the surface 104 of the conduit 100 and within channel of flow 106. As illustrated in FIGS. 1A and 1B, the conduit 100 can be part of a household sewer line, a branch sewer line, a mainline sewer, or a trunk sewer and measure between about 2 inches and about 144 inches in internal diameter. The conduit 100 can be manufactured from a variety of materials including plastic, concrete, iron, clay, wood, and bituminous fiber. The collection of the fats, oils or grease 102 can include other inert and resilient materials common to sewer systems including baby wipes, cigarettes, wood, steel, and general detritus. The collection of fats, oils or grease 102 can form locally on the surface 104 of the conduit 100 through a chemical salt reaction between acidic hydrocarbons and a basic pipe surface 104. Alternatively, the collection 102 can be generated upstream, transported downstream through hydraulic flow through the conduit 100, and deposited on the pipe, typically at hydraulically restricted areas such as bends, reducers, low slope sections, roughened surfaces, or other inert blockages. The channel of flow 106 can be blocked partially or entirely by the collection 102.

Figure 2A:
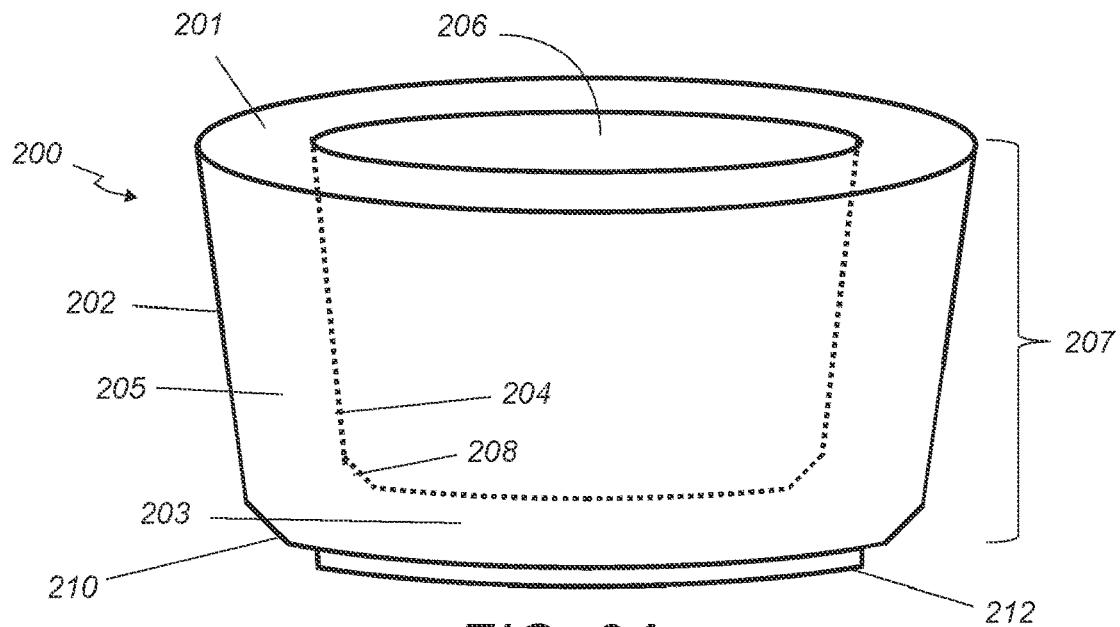
FIGS. 2A and 2B are a side view and an end view, respectively, of a plant-based vessel for retaining hydrocarbon fluids in the shape of a bowl, according to some embodiments.
Figure 2B:
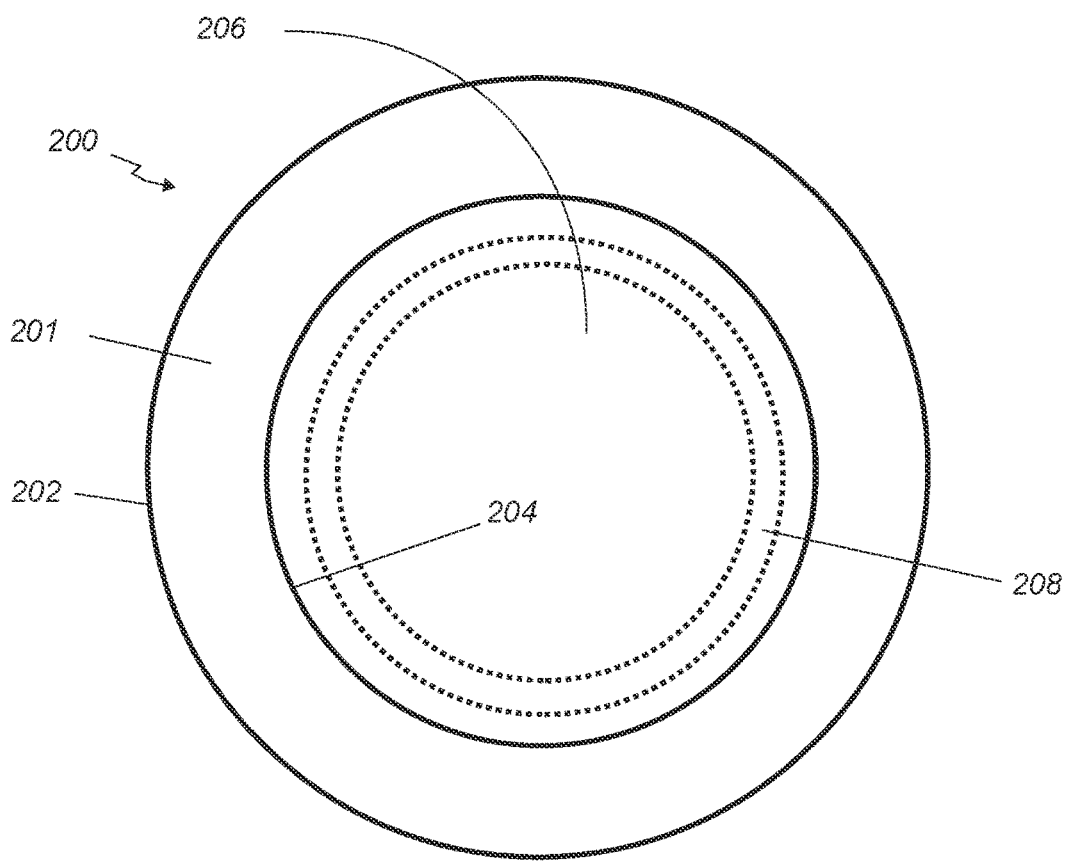

FIGS. 2A and 2B depict a vessel 200 according to some embodiments of the subject technology. As illustrated in FIGS. 2A and 2B, the vessel 200 may comprise a sidewall 207 surrounding an interior region 206 configured to receive and retain a fluid. The sidewall 207 may include an interior surface 204 and an exterior surface 202. The sidewall 207 may comprise a base portion 203, a side portion 205 extending upwardly from the base portion 203, and a top surface 201. All or a portion of the vessel 200 may be formed of a plant-based substrate configured to retain a hydrocarbon fluid of up to or exceeding 250 degrees Fahrenheit. The vessel can retain the fluid for at least 14 days without substantial deformation of the vessel or leaching of the hydrocarbon fluid. A vessel formed of a plant-based substrate can be disposed in a wide variety of ways including through biological treatment. A vessel that can retain fluids up to and exceeding 250 degrees Fahrenheit without leaching could receive and retain waste cooking oils, fats, or grease as they are generated and reduce disposal of hydrocarbon fluids into the sewer system.

As depicted in FIGS. 2A and 2B, in some embodiments of the technology the interior surface 204 of the vessel 200 can be chamfered along all or a portion of its bottom edge 208. Additionally, or alternatively, the exterior surface 202 of the vessel 200 can be chamfered along all or a portion of its bottom edge 210. Chamfered edges can facilitate the removal of the vessel 200 from a cast mold during manufacture and reduce the likelihood of cracking and breaking during packing, shipping, handling, and use.

As depicted in FIGS. 2A and 2B, in some embodiments of the technology the vessel 200 may optionally include a pedestal rib 212 at the base 203. The pedestal rib 212 can have a diameter smaller than that of the base 203, which reduces the total surface area in contact with a table, counter, or similar support plane. The reduced surface area of the pedestal rib 212 may also reduce the tendency of the vessel 200 to rock or shift while in use. A stable device, through the action of the pedestal rib 212, is less likely to tip or spill, which is a beneficial feature for a device that is receiving and retaining fluids up to or exceeding 250 degrees Fahrenheit.

In some embodiments of the technology, the vessel 200 can be monolithically formed by applying a pressure of at least 24,000 psi to a plant-based substrate within a cast mold of the desired physical configuration. In some embodiments the applied pressure may be less than or greater than 24,000 psi depending on the physical properties of the substrate and the desired configuration of the vessel 200. The applied pressure can be applied hydraulically or through other means such as actuation of a screw. The applied pressure can compact and densify the plant-based substrate and cause physical bridging and entanglement of individual particles.

In some embodiments, the applied pressure can express from the substrate a solution with binding properties. By example, lignin can be expressed by hydraulic pressure from sawdust. The lignin solution can flow to occupy interstices and fasten individual sawdust particles to one another. After compaction and densification, the vessel 200 can be resilient to deformation and be expelled from the mold.

In some embodiments of the technology, the vessel 200 can be manufactured with or without the application of external binding agents which are used to hold the underlying substrate particles together in the desired configuration. External binding agents may include wax, lignin, polymers, water, starch, and other suitable agents.

In some embodiments of the technology, the vessel 200 can be manufactured with or without the application of external heat. Heat can be used to increase the plastic deformation of the substrate at the particle level and increase bridging and entanglement interactions, which produces a vessel 200 more resilient to deformation.

In some embodiments of the technology, the vessel 200 can be formed of a single homogenous plant-based substrate. The substrate particle can be less than about 0.5 mm, less than about 1.0 mm, less than about 2.0 mm, less than about 4.0 mm, or greater than about 4.0 mm in diameter. By example a wood substrate can be used as a fine dust less than 0.5 mm in particle size, or in another embodiment, as a wood chip greater than about 4.0 mm in diameter. Depending on the particle size, the applied pressure, the use of external binding agents, or heat, the resultant vessel 200 can be substantially permeable or impermeable to a hydrocarbon fluid. In some aspects of the technology, the vessel 200 may be formed of two or more different plant-based substrates. The different plant-based substrates may have generally the same particle size or different particle sizes. In some embodiments, the vessel 200 may be formed of substrate particles of different sizes of the same plant-based substrate.

The plant-based substrate could be sawdust, or sugarcane bagasse, or coconut coir, or rice husk, or any combination thereof. Plant-based substrates are generally low cost and readily available in a variety of markets and geographies. Plant-based substrates also have the advantage that they are biodegradable and can be converted through biological processes into carbon dioxide, water, and minerals within a period of 6 months.

Plant-based substrates contain natural binding agents, such as lignin, which can be expressed and used to hold the vessel together. The fibrous and vascular structure of plant tissue can increase absorption of the hydrocarbon fluid through capillary action and by providing interstitial space into which the hydrocarbon fluid can move be absorbed.

In some embodiments of the technology, the substrate can be substantially impermeable to hydrocarbon fluids. In such embodiments the hydrocarbon fluid can be retained within the vessel and allowed to cool, congeal, or solidify. The interior region 206 of the vessel 200 can be sized to retain between approximately 25 mL and 500 mL of a hydrocarbon fluid or other sizes suitable for application within a household. An embodiment of this nature could be useful for the collection of saturated fats, oils and greases which can solidify at room temperature.

In some embodiments of the technology, the substrate can have absorbent properties and the vessel 200 can be formed such that the volume of the interstitial space between the particles comprising the wall 205 and base 203 is equal to or greater than the volume of the interior region 206 of the vessel. In such an embodiment, hydrocarbons can be poured into the vessel and allowed to percolate or absorb into the interstitial space of the vessel 200. An embodiment of this nature may be useful for the collection of unsaturated fats, oils and greases which remain liquid at room temperature.

Figure 3:
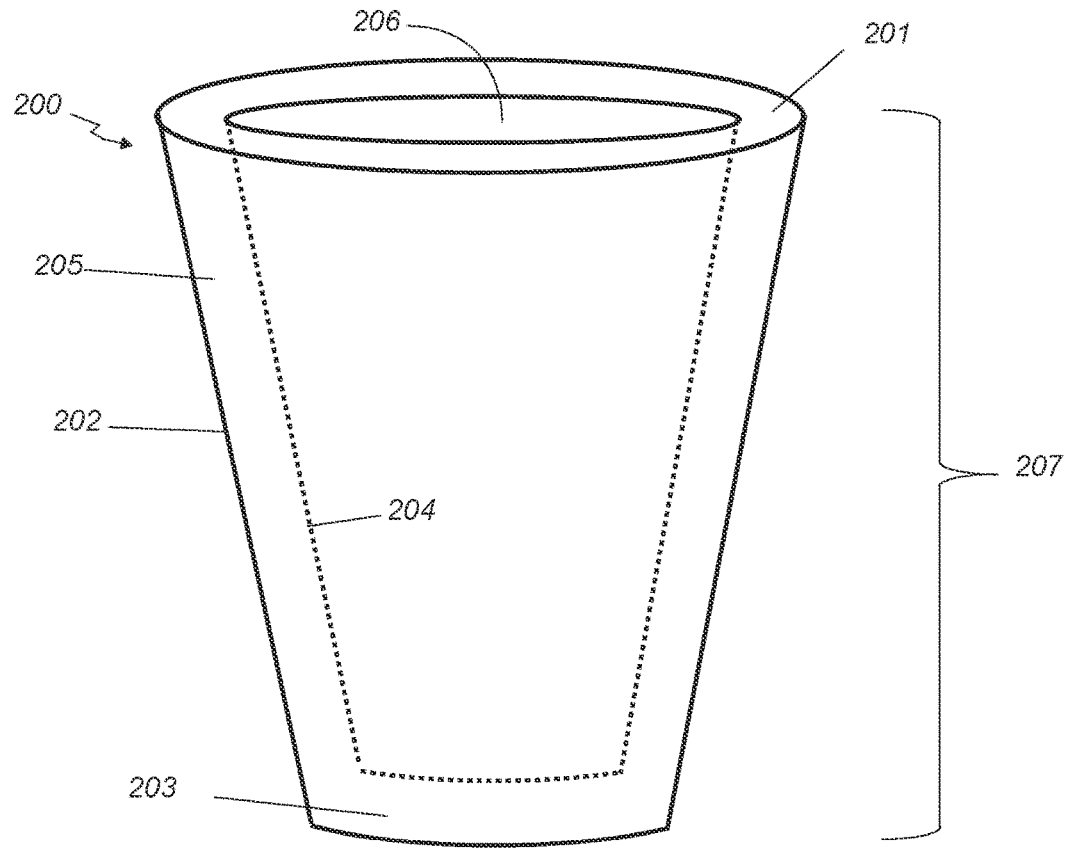
FIG. 3 is a side view of a plant-based vessel for retaining hydrocarbon fluids in the shape of a cup, according to some embodiments.
Figure 4:
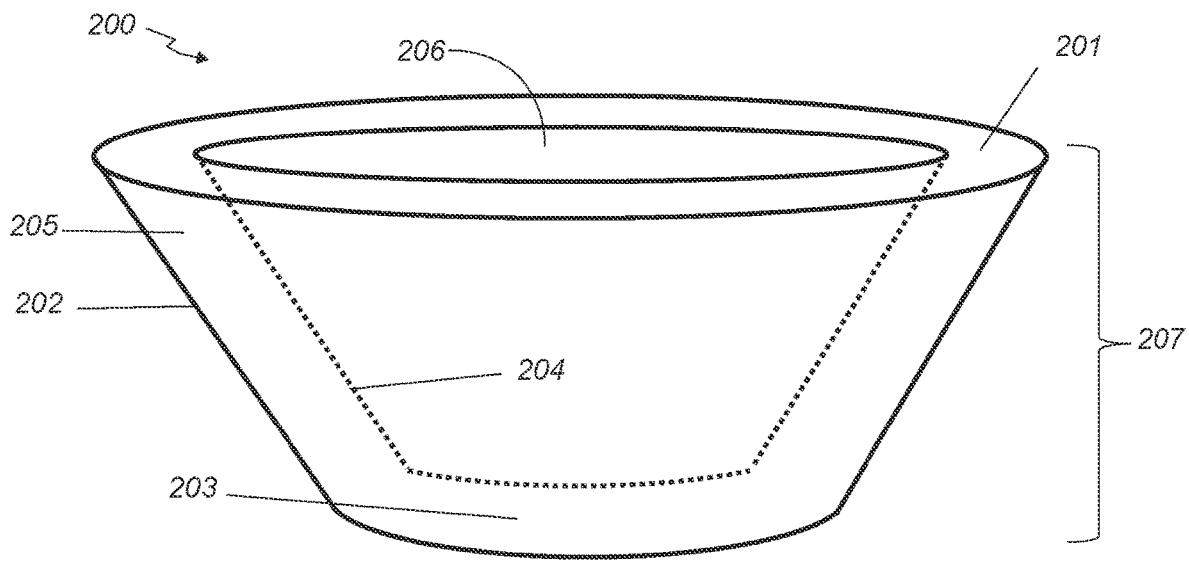
FIG. 4 is a side view of a plant-based vessel for retaining hydrocarbon fluids in an alternative shape, according to some embodiments of the present technology.

As illustrated in FIGS. 3 and 4 in some embodiments of the technology, the vessel 200 can be formed in a variety of configurations including a generally cup-like configuration or a bowl-like configuration. For example, in such embodiments, the vessel can have a tapered profile in which the outer diameter of the bottom portion of the vessel is smaller than the inner diameter a top portion of the vessel.

Figure 5A:
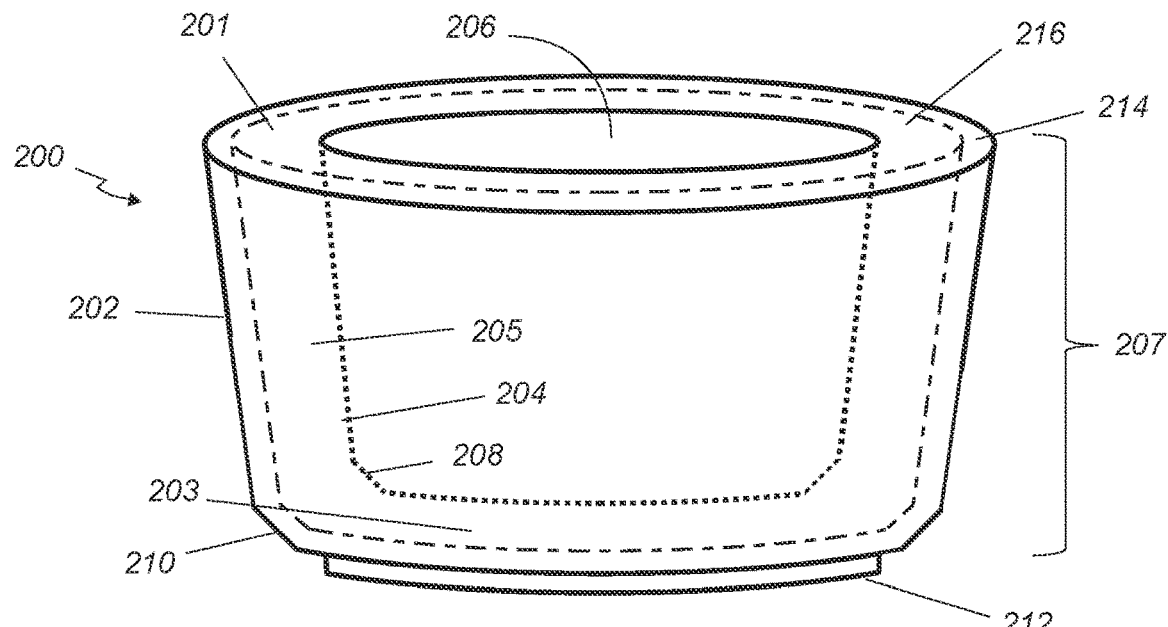
FIGS. 5A and 5B are a side view and an end view, respectively, of a plant-based vessel for retaining hydrocarbon fluids with outer and interior substrates of differing hydraulic conductivities, according to some embodiments.
Figure 5B:
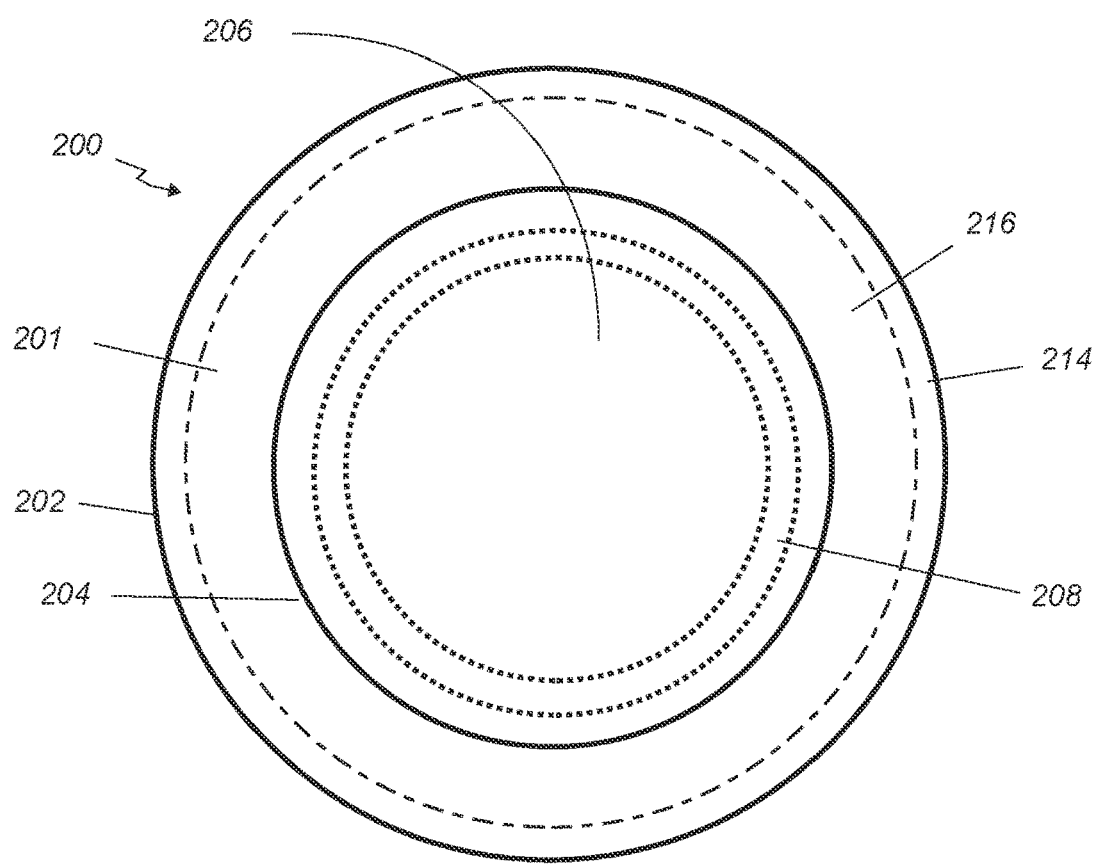
Figure 6A:
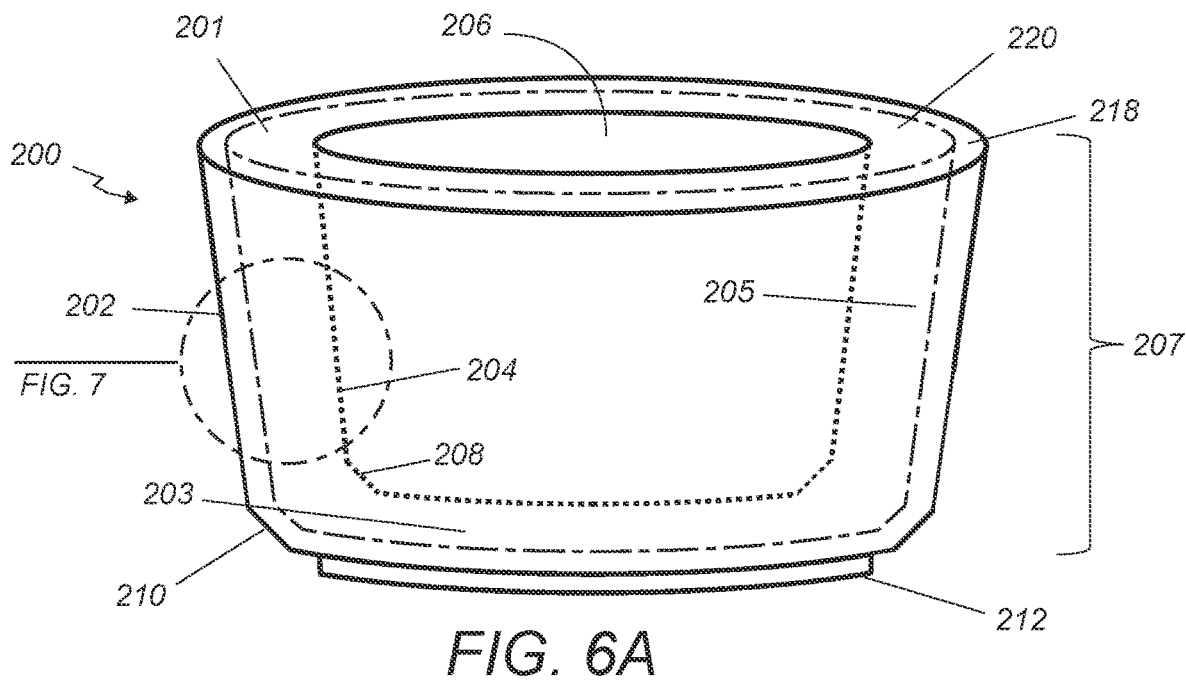
FIGS. 6A and 6B are a side view and an end view, respectively, of a plant-based vessel for retaining hydrocarbon fluids with differing outer and interior substrates, according to some embodiments.
Figure 6B:
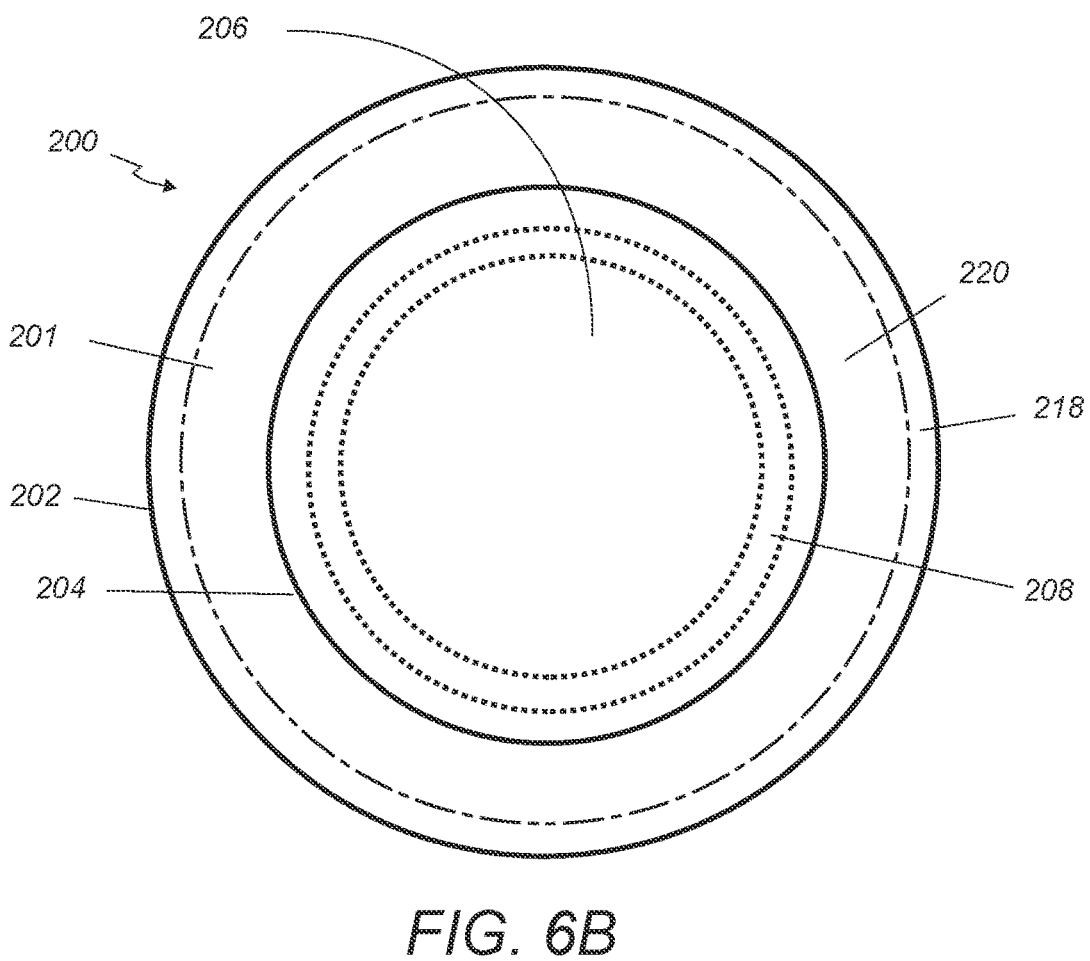
Figure 7:
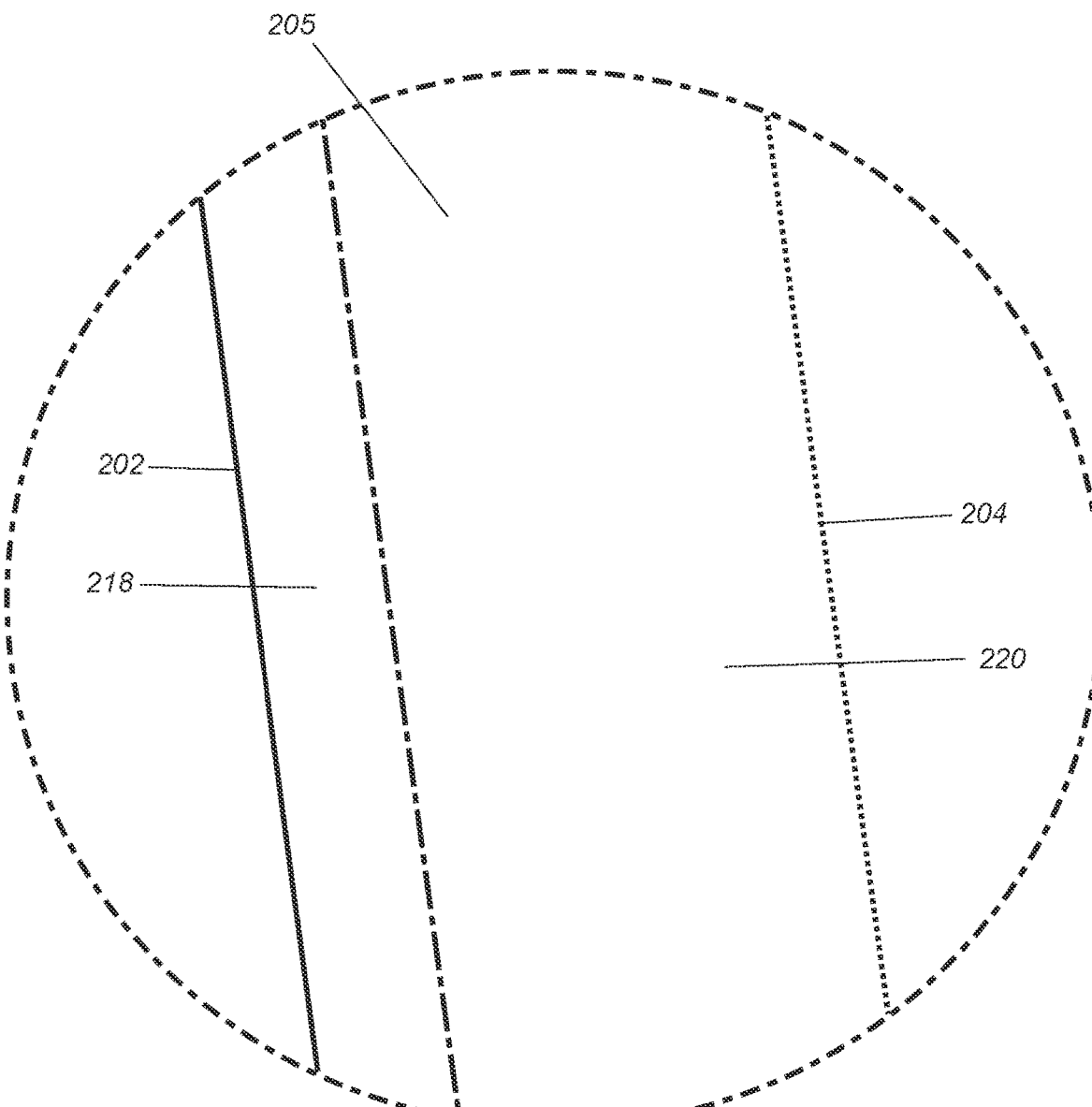
FIG. 7 illustrates a detail view of the vessel wall comprised of differing substrates, according to some embodiments.

In some embodiments of the technology, the sidewall 207 of the vessel 200 may be formed of multiple substrates. For example, as shown in FIGS. 5A and 5B, the sidewall 207 of the vessel 200 may include an outer portion 214 formed of a first substrate and an inner portion 216 formed of a second substrate different than the first substrate. As such, when the vessel 200 receives a hydrocarbon fluid within the interior region 206, the second substrate of the inner portion 216 is in direct contact with and closer to the hydrocarbon fluid than the first substrate of the outer portion 214. In some embodiments, for example, the second substrate may have a higher hydraulic conductivity than the first substrate. Having a substrate with a higher hydraulic conductivity at the inner portion 216 (relative to the hydraulic conductivity of the substrate at the outer portion) may be advantageous as it provides the vessel 200 with a more absorbent surface for first contact with the hydrocarbon fluid while keeping the vessel 200 substantially resilient to leaching via the lower hydraulic conductivity at the outer portion 214. In contrast, in some embodiments the vessel 200 may have a higher hydraulic conductivity at the outer portion 214 than at the inner portion 216, for example as shown in FIGS. 6A and 6B. For instance, in some aspects of the technology the vessel 200 may include a sugarcane bagasse at the outer portion 214 and sawdust at the inner portion 216.

A sidewall and/or vessel having differing hydraulic conductivities can be achieved in a variety of manners including using the same substrate with a differing degree of compaction, the same substrate with different particle sizes, the same substrate with and without a binding agent, or the same substrate with and without the application of heat during the manufacturing process.

Figure 8A:
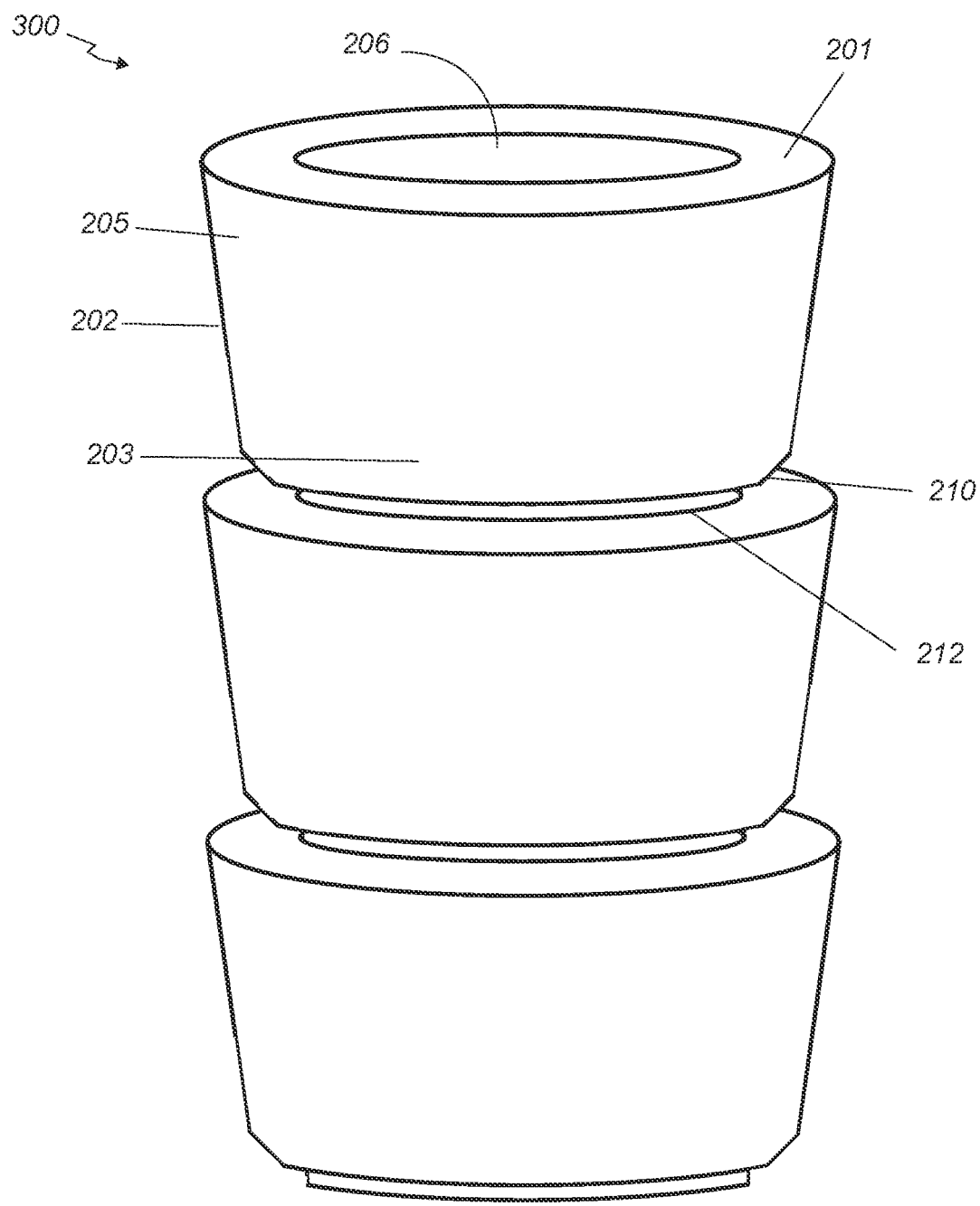
FIGS. 8A and 8B illustrates an alternative embodiment of a plant-based vessel for retaining hydrocarbon fluids in which a plurality of vessels stack within themselves, according to some embodiments.

As illustrated in FIG. 8A, the present technology may include a plurality of vessels 300, each of which is configured to stack within or on top of one another. In an example of such embodiments, the vessel 200 may include a pedestal rib 212 that is sized with an outer diameter about 1.0 mm less than the internal diameter of the aperture of the top surface 201 of the vessel. In such a configuration, one vessel 200 can be stacked on top of another vessel 200 with the pedestal rib 212 of the top vessel protruding into the aperture of the top surface 201 of the bottom vessel. The protrusion of the pedestal rib 212 can restrain the top vessel from moving laterally relative to the bottom vessel. This configuration could reduce space required for packing, shipping, and storing.

Figure 8B:
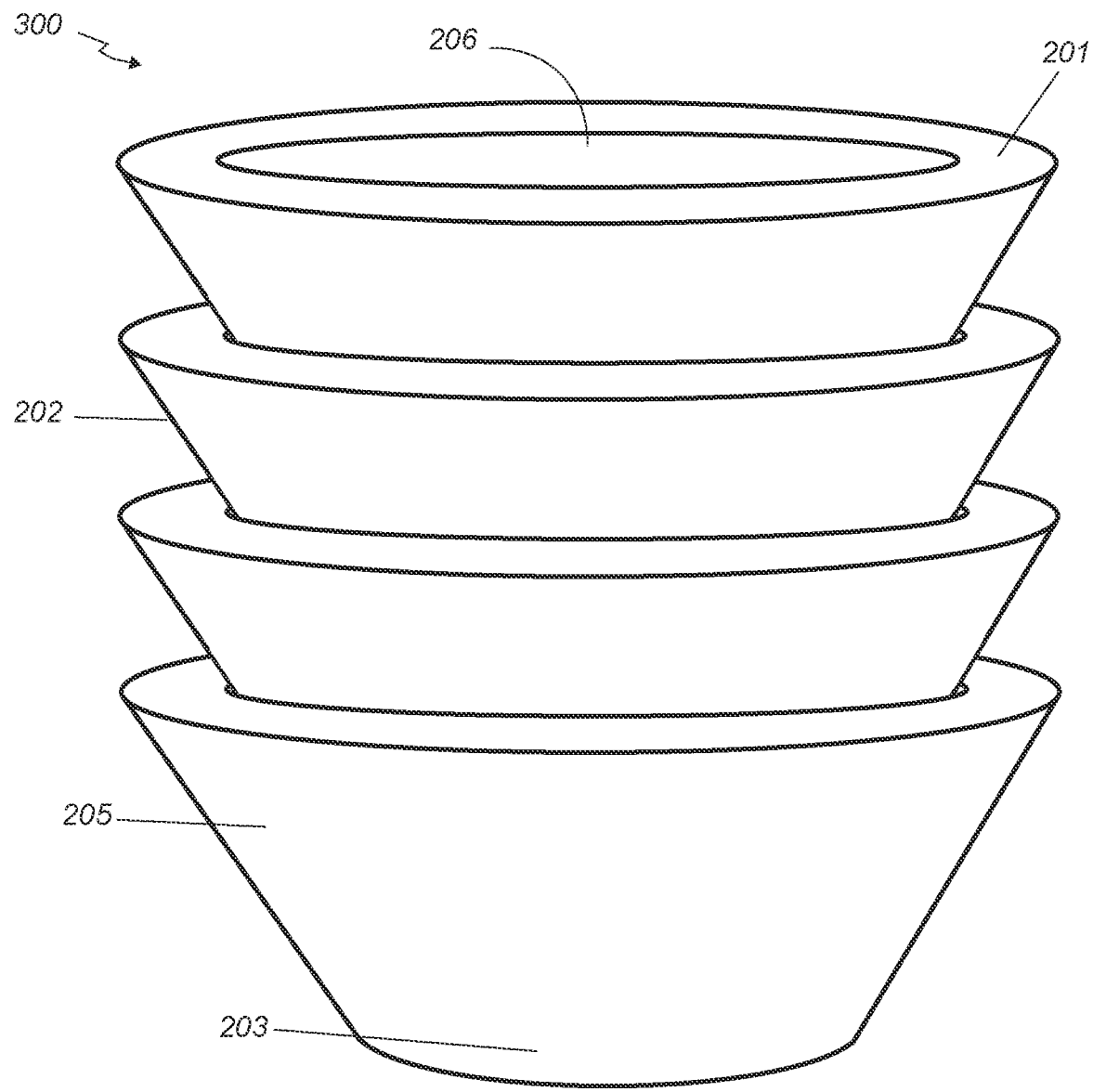

FIG. 8B shows another example of stackable vessels in which the vessels have a tapered profile (i.e., the outer diameter of the bottom portion of the vessel 203 is smaller than the inner diameter a top portion of the vessel 201). In such a configuration, one vessel 200 can be stored within the interior region 206 of another vessel 200. The protrusion of the top vessel 200 into another vessel 200 can restrain the top vessel from moving laterally relative to the bottom vessel.

In some embodiments, the vessel 200 may include a plurality of discrete compartments (not shown), each of which is configured to retain a discrete volume of the hydrocarbon fluid.

Figure 9A:
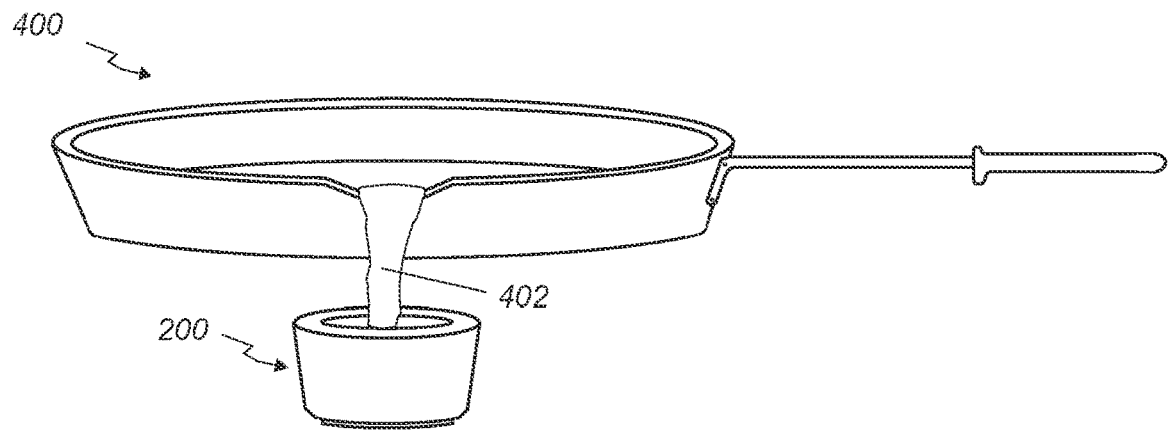
FIGS. 9A and 9B schematically illustrate a system for receiving and retaining a hydrocarbon fluid in a plant-based vessel and disposing thereof.
Figure 9B:
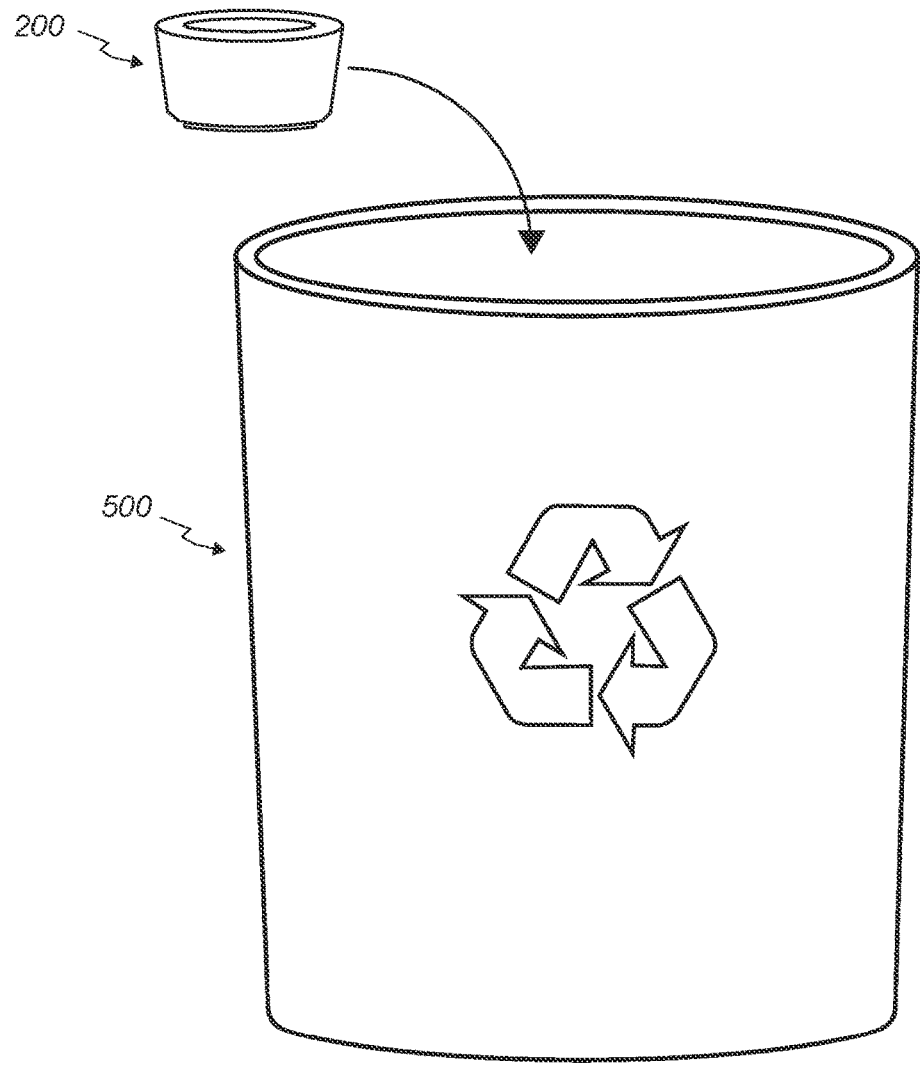

FIGS. 9A and 9B depict a method for using the vessel 200 to safely contain and/or dispose of waste cooking oil, fats, grease, or other waste hydrocarbon fluids 402 (referred to collectively in the following description as "waste 402"). As depicted in FIG. 9A, the vessel 200 may receive waste into its interior region from a frying pan 400 or other cooking implement, such as a pot, a wok, a griddle, a sheet, a basket, a cup, a bowl, etc. After receiving the waste 402, the vessel 200 and waste 402 may sit for 15-30 minutes or other duration depending on the temperature of the waste 402 when poured into the vessel 200. During this time the waste 402 cools, and in some embodiments, solidifies, or congeals, or percolates and absorbs into the vessel 200.

As illustrated in FIG. 9B, once the waste 402 has cooled to a temperature at which it may be safely disposed, the vessel 200 and waste 402 contained therein can be transferred to a waste receptacle. Preferably, the vessel 200 and waste 402 are disposed in such a manner that the waste 402 is subjected to one or more biological disposal processes 500, such as composting, anaerobic digestion, aerobic digestion, and waste-activated sludge processes. Biological disposal of the hydrocarbon fluid and vessel segregates hydrocarbons from the drain and sewer system and helps to prevent occlusions and blockages. Accordingly, the devices and associated methods disclosed herein provide a clean and discrete method of hydrocarbon disposal for households while reducing environmental impact and potentially providing a valuable end product in the form of compost, soil amendments, or renewable energy.

CONCLUSION

Although many of the embodiments are described above with respect to systems, devices, and methods for an improved device for the collection and disposal of waste household fats, oils, and grease, the technology is applicable to other applications and/or other approaches, such as the collection and disposal of other household waste fluids and food waste and the collection and disposal of waste fats, oils, and grease at different scales and locations such as restaurants, schools, industrial and manufacturing facilities, laboratories, or any other facility requiring waste fluid disposal. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-9B.

The above detailed descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order.

The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of manufacture, comprising:
   forming a vessel by applying a pressure of at least 24,000 psi to sawdust, the vessel having an interior region configured to receive and retain a hydrocarbon fluid, wherein the vessel includes a plurality of discrete compartments, each of which is configured to retain a discrete volume of the hydrocarbon fluid.

2. The method of claim 1, wherein the vessel is formed without the aid of an external binding agent.

3. The method of claim 1, wherein the pressure is applied hydraulically.

4. The method of claim 1, wherein the vessel is a bowl.

5. The method of claim 1, wherein the vessel is a cup.

6. The method of claim 1, wherein an outer layer of the vessel is compacted to provide a substantially impermeable layer.

7. The method of claim 1, wherein an innermost layer of the vessel is compacted to provide a substantially permeable layer.

8. A method for manufacturing a device, the method comprising:
   applying a pressure of at least 24,000 psi to a plant-based substrate positioned within a mold to compact and densify the plant-based substrate into a vessel, wherein the vessel defines a plurality of interior regions each configured to receive and retain a hydrocarbon fluid of at least 250 degrees Fahrenheit for at least 7 days without substantial deformation of the vessel or leaching of the hydrocarbon fluid.

9. The method of claim 8, wherein the plant-based substrate comprises sawdust.

10. The method of claim 8, wherein the plant-based substrate consists of sawdust.

11. The method of claim 8, wherein the pressure is applied hydraulically.

12. The method of claim 8, wherein the pressure is applied without the application of an external binding agent.

13. The method of claim 8, wherein the pressure is applied without the application of external heat.

14. The method of claim 8, further comprising applying heat to the plant-based substrate while the pressure is applied.

15. The method of claim 8, wherein the vessel is bowl-shaped.

16. The method of claim 8, wherein the vessel is cup-shaped.

17. The method of claim 8, wherein each of the interior regions is configured to retain between about 25 mL and about 500 mL of the hydrocarbon fluid of at least 250 degrees Fahrenheit for at least 7 days without substantial deformation of the vessel or leaching of the hydrocarbon fluid.

* * * * *